(12) United States Patent
Polydoros et al.

(10) Patent No.: US 9,998,304 B1
(45) Date of Patent: Jun. 12, 2018

(54) METHODS AND SYSTEMS FOR ESTIMATING AND MITIGATING OFDM INTERFERENCE

(71) Applicant: TrellisWare Technologies, Inc., San Diego, CA (US)

(72) Inventors: Andreas Polydoros, San Diego, CA (US); Cenk Kose, San Diego, CA (US)

(73) Assignee: TrellisWare Technologies, Inc., San Diego, CA (US)

(*) Notice: Subject to any disclaimer, the term of this patent is extended or adjusted under 35 U.S.C. 154(b) by 0 days. days.

(21) Appl. No.: 15/615,172

(22) Filed: Jun. 6, 2017

(51) Int. Cl.
| | |
|---|---|
| H04K 1/10 | (2006.01) |
| H04L 27/28 | (2006.01) |
| H04L 25/03 | (2006.01) |
| H04B 17/336 | (2015.01) |
| H04L 27/26 | (2006.01) |
| H04L 7/00 | (2006.01) |
| H04L 12/26 | (2006.01) |
| H04L 27/36 | (2006.01) |
| H04L 27/20 | (2006.01) |

(52) U.S. Cl.
CPC ..... H04L 25/03159 (2013.01); H04B 17/336 (2015.01); H04L 7/0008 (2013.01); H04L 27/20 (2013.01); H04L 27/2678 (2013.01); H04L 27/366 (2013.01); H04L 43/12 (2013.01); H04L 25/03203 (2013.01); H04L 27/261 (2013.01)

(58) Field of Classification Search
CPC ........... H04L 25/03159; H04L 27/2678; H04L 7/0008; H04L 43/12; H04L 27/366; H04L 27/20; H04L 27/261; H04L 25/03203; H04L 27/2607; H04B 17/336; H04J 11/003

USPC ................ 375/260, 261, 262, 264, 280, 346
See application file for complete search history.

(56) References Cited

U.S. PATENT DOCUMENTS

| | | | | |
|---|---|---|---|---|
| 5,682,376 | A * | 10/1997 | Hayashino | .......... H04L 27/2607 370/206 |
| 2008/0187065 | A1* | 8/2008 | Chang | .................... H04J 11/003 375/267 |

OTHER PUBLICATIONS

Luise, M. et al. "Blind Equalization/Detection for OFDM Signals over Frequency-Selective Channels," IEEE Journal on Selected Areas in Communications, vol. 16, No. 8, Oct. 1998, 11 pages.

* cited by examiner

*Primary Examiner* — Phuong Phu
(74) *Attorney, Agent, or Firm* — Perkins Coie LLP

(57) ABSTRACT

Methods and systems for estimating and mitigating OFDM interference to enable reliable communications with minimal a priori knowledge of the interfering OFDM signal are presented. Embodiments of the present invention hypothesize modulation symbols from a reference signal set, which may not be identical to the interference signal set, and compute a channel sequence to minimize an error between the observed samples and a product of the channel sequence and the hypothesized modulation symbols. The interfering OFDM signal may be estimated and mitigated with no reliance on knowledge of the interference signal set, although this may result in the inability to decode and demodulate the interfering OFDM signal when embodiments of the present invention are extended from single-input single-output systems to multiple-input single-output systems.

20 Claims, 7 Drawing Sheets

METHODS AND SYSTEMS FOR ESTIMATING AND MITIGATING OFDM INTERFERENCE

FIELD OF THE INVENTION

The present invention relates to communication systems that are subject to interference, and in particular, the estimation and mitigation of OFDM interference, which routinely results in wireless systems operating in unlicensed communication spectrum.

BACKGROUND

The use of orthogonal frequency division multiplexing (OFDM) signaling has become ubiquitous because of its resistance to multipath fading and impulsive noise. In recent years, the adoption and proposal of OFDM as a standard transmission technique has increased in a host of applications, such as digital audio broadcasting (DAB), digital video broadcasting (DVB-T), and broadband indoor and outdoor wireless systems (e.g. the 802.11 standard, LTE, and WiMAX).

Communicating in the presence of existing OFDM signals is challenging, and an active area of research. Previous approaches that include parallel- and successive-interference cancellation (PIC and SIC, respectively) attempt to decode both the signal of interest and the interfering OFDM signal, and subsequently cancel the latter. Decoding both signals requires knowledge of the structure and parameters of the interfering OFDM signal, which is acquired, decoded and then excised. However, knowledge of the structure and parameters of the OFDM interference may not always be readily available, and existing approaches may be unable to mitigate the effect of the interfering OFDM signal.

SUMMARY

Thus, it is an object of the embodiments described herein to provide methods and systems for estimating and mitigating OFDM interference to enable reliable communications with minimal a priori knowledge of the interfering OFDM signal. In particular, a reference modulation symbol set, which may not be identical to the interference modulation symbol set, is used to estimate the product of a channel sequence and hypothesizes modulation symbols in order to minimize the error between the product and the observed samples. That is, an estimate of the OFDM interference may be estimated (based on the product) and cancelled, but the receiver may not be able to demodulate the interfering OFDM signal.

In one embodiment, a method for estimating and mitigating OFDM interference comprises receiving a composite signal through a channel, wherein the composite signal comprises a sum of a signal of interest and an interfering OFDM signal, the interfering OFDM signal comprising an interfering OFDM symbol, the interfering OFDM symbol comprising a plurality of subcarriers, and each of the subcarriers comprising a modulation symbol from an interference signal set. A modulation symbol for each of the subcarriers of the interfering OFDM symbol is hypothesized, where each of the hypothesized modulation symbols are from a reference signal set. A frequency-domain channel sequence is generated based on an optimization, the optimization minimizing an error between a frequency-domain representation of the composite signal and a product of at least the hypothesized modulation symbol and the frequency-domain channel sequence in a least-squares sense. Finally, an estimate of the interfering OFDM symbol is generated based on the product of the hypothesized modulation symbol and the frequency-domain channel sequence.

These illustrative embodiments are mentioned not to limit or define the limits of the present subject matter, but to provide examples to aid in the understanding thereof. Illustrative embodiments are discussed in the Detailed Description, and further examples are provided there. Advantages offered by various embodiments may be further understood by examining this specification and/or by practicing one or more embodiments of the claimed subject matter.

BRIEF DESCRIPTION OF THE DRAWINGS

These and other features, aspects, and advantages of the embodiments described herein will become better understood with regard to the following description, claims, and accompanying drawings, where:

Figure 1:
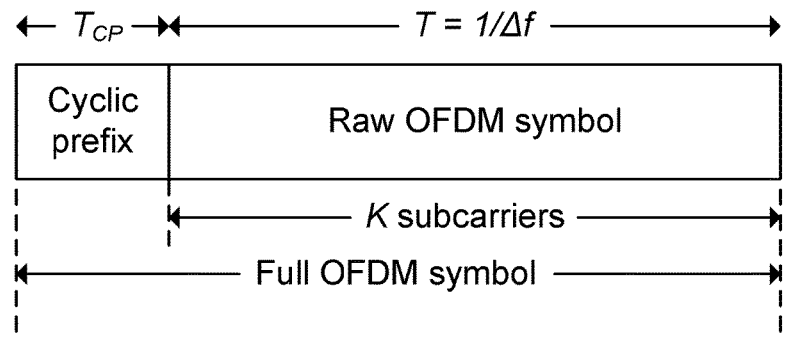
FIG. 1 is a block diagram of an OFDM symbol.

Like labels are used to refer to the same or similar modules in the drawings.

DETAILED DESCRIPTION

Embodiments of the present invention are directed towards communication systems wherein the signal of interest (SOI) is a single-carrier waveform (e.g., quadrature amplitude-shift keying (QASK) or continuous phase modulation (CPM)) that is observed in the presence of strong OFDM interference. The methods and systems described herein assume that the parameters of the OFDM interference are unknown, and that the SOI receiver processing bandwidth is large enough to contain the OFDM interference bandwidth.

As shown in FIG. 1, a full OFDM symbol comprises a raw OFDM symbol with length $T=1/\Delta f$, which comprises K subcarriers with subcarrier spacing $\Delta f$, and the cyclic prefix (CP), whose length $T_{CP}$ is typically selected to be greater than the delay spread of the wireless channel. The inverse of the delay spread determines the channel coherence bandwidth, and in order to minimize the overhead due to the CP, the quantity $T/T_{CP}$ is typically large. That is, there may be many subcarriers per coherence bandwidth.

In an embodiment, an OFDM transmitter loads each of the K subcarriers with symbols from a digital alphabet $\mathbb{Q}$, and forms a quadrature baseband signal:

$$s(t) = \sum_{k=0}^{K-1} Q[k]\exp(-j2\pi\Delta ft), \; -T_{CP} \leq t < T,$$

where Q[k] is the digital symbol chosen from $\mathbb{Q}$ that loads the k-th subcarrier. The signal s(t) is typically constructed via an inverse discrete Fourier transform (IDFT), followed by filtering and digital-to-analog conversion (DAC).

After transmission over a time-invariant channel with a delay spread less than the cyclic prefix duration $T_{CP}$, and assuming that the transmitter and receiver are time and frequency synchronized, the frequency-domain received signal is given by $$Z[k]=H[k]Q[k]+W[k], \; k=0,1,\ldots,K-1,$$

where H[k] is the overall channel frequency response at frequency k$\Delta$f with respect to the band center, and {W[k]} is channel/background noise, typically modeled as a white Gaussian process across subcarriers.

OFDM therefore converts a frequency selective channel into a set of non-interfering (additive white Gaussian noise) AWGN channels with different gains, which have to be estimated. The estimation of the subcarrier channel gains may involve the use of pilot subcarriers, {k ∈ P}, for which the value Q[k] is known prior to transmission, which enables the generation of the subcarrier channel/gain estimates $\{\hat{H}[k]: k \in P\}$ for the pilot subcarriers. The remaining subcarrier gain estimates $\{\hat{H}[k]: k \notin P\}$ may be generated by interpolating the estimates from the pilot subcarriers.

Figure 2:
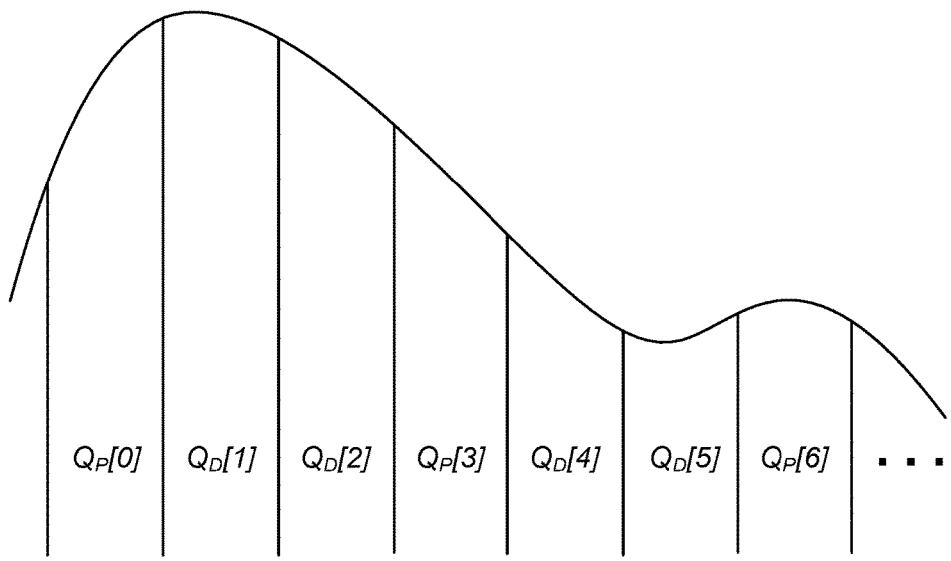
FIG. 2 is a frequency-domain representation of an OFDM symbol showing pilot and data subcarriers in a fading environment.

FIG. 2 shows the frequency-domain representation of an OFDM symbol with pilot and data subcarriers in a fading environment, denoted $Q_P[k]$ and $Q_D[k]$, respectively. As discussed above and in the context of FIG. 2, the known modulation symbols in pilot subcarriers 0 and 3 may be used to generate the subcarrier gain estimates $\hat{H}[0]$ and $\hat{H}[3]$, respectively. These gain estimates may subsequently be used to generate the subcarrier gain estimates $\hat{H}[1]$ and $\hat{H}[2]$. In order to obtain accurate subcarrier channel/gain estimates, the number of pilot subcarriers should be on the order of $(T/T_{CP})$.

Typically, the modulated symbols {Q[k]} are modeled as independent random variables due to channel interleaving, in which case data detection in a conventional OFDM receiver may be accomplished on a per-subcarrier basis, independently, using the subcarrier gain estimates. That is, for each of the k ∈ K subcarriers, the gain estimate $\hat{H}[k]$ can be used to generate an estimate of the modulated symbol Q[k], given the corresponding subcarrier observation Z[k].

In contrast to the operation of a conventional OFDM receiver that generates an estimate of the modulated symbols {Q[k]} in order to decode the signal, embodiments of the present invention dispense with several of the key assumptions and requirements of the conventional OFDM receiver. Specifically, the embodiments described herein may not require knowledge of the modulation set $\mathbb{Q}$ or the manner in which data is mapped onto $\mathbb{Q}$, the location of pilot subcarriers (if any), and any training symbols, as well as fine frequency synchronization.

That is, embodiments of the present invention are directed towards solely estimating the waveform samples of an unknown OFDM signal which interferes with a signal of interest, possibly much weaker than the OFDM interference. This results in the assumption that the subcarrier gains are correlated across multiple subcarriers, which motivates the use of a model with memory across subcarriers, whether or not the actual subcarrier symbols are correlated. Thus, as will be described below in some embodiments, a trellis structure is used in the estimation of the interfering OFDM signal.

Figure 3:
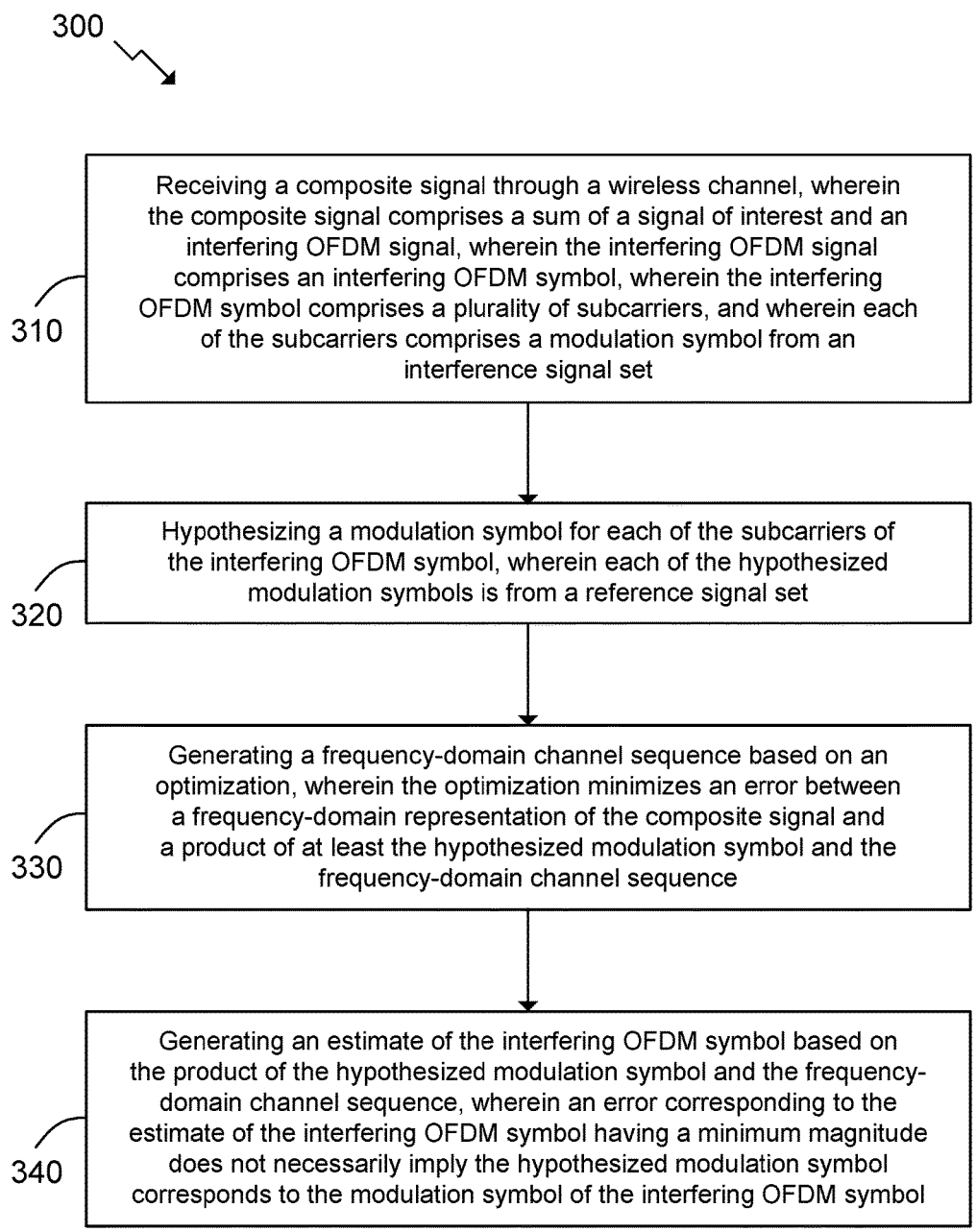
FIG. 3 is a flowchart for a method for estimating and mitigating OFDM interference, according to an embodiment of the present invention.

FIG. 3 is a flowchart for a method for estimating and mitigating OFDM interference, according to an embodiment of the present invention. In some embodiments, the order of steps in flowchart 300 may be changed. Furthermore, some of the steps in flowchart 300 may be skipped or additional steps added.

The method 300 begins at step 310, wherein a composite signal, which comprises the signal of interest and an interfering OFDM signal, is received through a wireless channel. In another embodiment, the signal of interest and the interfering OFDM symbol may be received through an asymmetrical digital subscriber line (ADSL) wireline channel, or other similar wireline channels. The interfering OFDM signal comprises at least one OFDM symbol. The received OFDM symbol (denoted the full OFDM symbol) comprises the raw OFDM symbol with a number of subcarriers and a cyclic prefix, wherein each of the subcarriers comprises a modulation symbol from an interference signal set.

Without loss of generality, it is assumed that the observed samples $z_u[n]$ of the full OFDM symbol are available at an integer multiple u of the OFDM interference bandwidth (denoted $B_I$). They are modeled as $$z_u[n]=i_u[n]+s_u[n]+w_u[n], \; n=-uK_{CP},\ldots,-1,0,1,\ldots uK-1,$$

where $s_u[n]$ is the signal of interest (SOI) sample, $i_u[n]$ is a sample of the interfering OFDM symbol, $w_u[n]$ is an additive white Gaussian noise sample, $K_{CP}=B_I T_{CP}$ is the nominal length (in samples) of the cyclic prefix.

For each interfering OFDM symbol, a uK-point Discrete Fourier Transform (DFT), which may be implemented as a Fast Fourier Transform (FFT) in an embodiment, of the useful part of the received noisy OFDM symbol (i.e., the raw OFDM symbol) is computed. This is followed by a u: 1 decimation process to produce frequency-domain samples.

The frequency-domain representation of the observed samples is given as $$Z[k] = \sum_{d=-D}^{D} H[d,k]Q[(k-d)_K] + S[k] + W[k], \; k = 0, 1, \ldots, K-1,$$

where H[d, k] is an unknown frequency gain from transmit subcarrier k-d to the receive subcarrier k, Q[k] is a modulation symbol from the interference signal set $\mathbb{Q}$, $(a)_K$ denotes the principal value of a modulo K, and D≤K/2 is a design parameter, which models the effective radius of inter-carrier interference (ICI) due to residual frequency offset (RFO).

Note that approximately Gaussian statistics are assumed for S[k] due to the FFT mixing of the time-domain received samples of the SOI, which is a single-carrier waveform. For the purposes of estimating the interfering OFDM signal, the term S[k]+W[k] is denoted as U[k], and is modeled as Gaussian (with unknown power). If the bandwidth of the SOI is smaller than the bandwidth of the interfering OFDM symbol, S[k] and subsequently U[k] will be correlated across frequency indices.

For each subcarrier k, the frequency-domain representation of the observed samples can be expressed as $$Z[k] \approx \underline{H}[k]^T \underline{Q}[k] + U[k],$$

where $\underline{H}[k]$ and $\underline{Q}[k]$ are (2D+1)-dimensional channel and modulation symbol vectors, respectively, and are represented as $$\underline{H}[k] = [H[D,k], \ldots, H[0,k], \ldots, H[-D,k]], \text{ and}$$

$$\underline{Q}[k] = [Q[(k+D)_K], \ldots, Q[k], \ldots Q[(k-D)_k]].$$

At step 320, a modulation symbol for each of the K subcarriers of the interfering OFDM symbol is hypothesized from a reference signal set $\tilde{\mathbb{Q}}$. In general, the reference signal set is different from the interference signal set, since the parameters of the interfering OFDM symbol are not known at the receiver. Based on the reference signal set, there are $\tilde{\mathbb{Q}}^K$ possible sequences $\tilde{Q} \triangleq [\tilde{Q}[0], \tilde{Q}[1], \ldots, \tilde{Q}[K-1]]$, one of which may be selected to approximate the actual transmitted sequence $Q \triangleq [Q[0], Q[1], \ldots, Q[K-1]]$.

At step 330, and for each of the $|\tilde{\mathbb{Q}}|^K$ possible sequences, a sequence of frequency-gain vectors (or frequency-domain channel sequence) $\tilde{\underline{H}} \triangleq [\tilde{H}[0], \tilde{H}[1], \ldots, \tilde{H}[K-1]]$, may be determined to generate a reconstructed OFDM interference symbol that provides the best fit to the frequency-domain representation of the observed samples. That is, a frequency-domain channel sequence is determined based on an optimization that minimizes the error between the frequency-domain representation of the observed samples (from the composite signal) and the product of the hypothesized modulation symbols (a symbol sequence) and the frequency-domain channel sequence.

In an embodiment, the optimization minimizes the error in the least-squares sense, and for the frequency-domain representation of the observed samples $\underline{Z} = [Z[0], Z[1], \ldots, Z[K-1]]$.

the optimization may be expressed as $$\tilde{Q}_0, \tilde{H}_0 = \underset{\tilde{Q}, \tilde{H}: \text{channel constraints}}{\operatorname{argmin}} \sum_{k=0}^{K-1} \lambda_k \left| Z[k] - \tilde{H}[k]^T \tilde{Q}[k] \right|^2,$$

where the set of nonnegative weights $\{\lambda_k\}_{k=0}^{K-1}$ can be chosen to account for the presence of the SOI in a band of frequencies.

That is, the best-fit (in a least-squares sense) channel sequence $\tilde{\underline{H}}$ may be computed for a given hypothesized modulation symbol vector $\tilde{Q}$. However, it is often impractical to compute a channel sequence for each hypothesized modulation symbol vector since an interfering OFDM signal typically employs hundreds or even thousands of subcarriers. In order to alleviate this complexity burden, and due to the limited frequency coherence (and parameterized by D as noted above), the estimation of a particular channel sequence $\tilde{\underline{H}}[k]$ need only involve hypothesized transmit subcarrier values around a neighborhood, determined by either one or both of the coherence bandwidth and the residual frequency offset.

Thus, the search across all the hypothesized modulation symbol vectors $\tilde{Q}$ can be implemented by a forward trellis with states defined by the state transitions, wherein all indices are interpreted modulo K (thereby suppressing the $(\cdot)_K$ notation):

state: $\sigma^{(f)}[k-1] \triangleq [\tilde{Q}[k+D-1], \ldots, \tilde{Q}[k-D]]^T$,
input: $\tilde{Q}[k+D]$, and
new state: $\sigma^{(f)}[k] \triangleq [\tilde{Q}[k+D], \ldots, \tilde{Q}[k-D+1]]^T$.

The channel sequences $\tilde{\underline{H}}[k]$ may be subject to per-survivor processing (PSP) with either filtering or smoothing using the forward branch metrics of the form $$BM^{(f)}(\sigma^{(f)}[k-1] \to \sigma^{(f)}[k]) = \lambda_k \left| Z[k] - \tilde{\underline{H}}^{(f)}[k]^T \begin{bmatrix} \tilde{Q}[k] \\ \sigma^{(f)}[k-1] \end{bmatrix} \right|^2,$$

where $\tilde{\underline{H}}^{(f)}[k] = [\tilde{H}[0,k], \tilde{H}[-1,k], \ldots, \tilde{H}[-D,k]]^T$ is the forward channel vector estimate at step k.

Alternatively, the backward progressing state transitions can be defined as:
state: $\sigma^{(b)}[k] \triangleq [\tilde{Q}[k+D], \ldots, \tilde{Q}[k-D+1]]^T$,
input: $\tilde{Q}[k-D]$,
new state: $\sigma^{(b)}[k-1] \triangleq [\tilde{Q}[k+D-1], \ldots, \tilde{Q}[k-D]]^T$,
and backward branch metrics of the form $$BM^{(b)}(\sigma^{(b)}[k-1] \leftarrow \sigma^{(b)}[k]) = \lambda_k \left| Z[k] - \tilde{\underline{H}}^{(b)}[k]^T \begin{bmatrix} \sigma^{(b)}[k] \\ \tilde{Q}[k-D] \end{bmatrix} \right|^2,$$

where $\tilde{\underline{H}}^{(b)}[k] = [\tilde{H}[0,k], \tilde{H}[1,k], \ldots, \tilde{H}[D,k]]^T$ is the backward channel vector estimate at step k.

The forward and backward channel recursions can be fused (in the completion step) to produce $(\tilde{\underline{H}}_0[k], \tilde{Q}_0[k])$, for each of the subcarriers ($\forall k$), which in an embodiment may be implemented in the manner described in "Adaptive soft-input soft-output algorithms for iterative detection with parametric uncertainty," authored by A. Anastasopoulos and K. M. Chugg, IEEE Transactions on Communications, Vol. 48, No. 10 (2008), which is hereby incorporated by reference herein in its entirety.

At step 340, an estimate of the raw interfering OFDM symbol is generated based on the hypothesized modulation symbol and the frequency-domain channel sequence. That is, for each subcarrier, the baseband OFDM interference is estimated as $$\hat{I}[k] = \tilde{\underline{H}}_0[k]^T \tilde{Q}_0[k], k=0,1,\ldots,K-1.$$

As discussed above, the embodiments generate an estimate of the raw interfering OFDM symbol based on an optimization that minimizes the error between the frequency-domain representation of the composite signal and the product of the hypothesized modulation symbols and the frequency-domain channel sequence, and in an embodiment, the error is minimized in a least-squares sense.

Since the error between $Z[k]$ and $\tilde{H}[k]\tilde{Q}[k]$ is minimized based on a reference signal set $\tilde{\mathbb{Q}}$ that is not necessarily equal to the interference signal set $\mathbb{Q}$ (since the parameters of the interfering OFDM symbol are unknown), the embodiments may achieve the minimum error (in a least-squares sense) despite the hypothesized modulation symbols not being equal to the modulation symbols of the interfering OFDM symbol.

That is, the embodiments are able to estimate (and subsequently mitigate) an interfering OFDM signal, but may not be able to successfully demodulate that interfering OFDM signal. In other words, the a priori information regarding the interfering OFDM signal (which would enable its demodulation as in some versions of SIC and PIC as described above) is being traded for the ability to mitigate the interfering OFDM signal. In the embodiments described herein, the error corresponding to the product of the hypothesized modulation symbols and frequency-domain channel sequence is minimized, but the error corresponding to the hypothesized modulation symbols themselves is not necessarily minimized.

The product of hypothesized modulation symbol and the frequency-domain channel sequence is upsampled and converted to the time-domain. In an embodiment, the time-domain representation is computed using a uK-point inverse Discrete Fourier Transform (IDFT). That is, the time-domain estimate of the raw interfering symbol is computed as $$\{\hat{i}_u[n]\} = \text{IDFT}_{uK}\{\hat{I}[k]\uparrow u\},$$

where ($\uparrow$ u) represents upsampling by a factor of u.

The time-domain estimate of the raw interfering OFDM symbol is then prepended with an estimate of the received cyclic prefix, adjusted for center frequency, and is subtracted from the time-domain observed samples of the full OFDM symbols, i.e.

$$\hat{s}_u^{(1)}[n] = z_u[n] - \hat{i}_u[n].$$

In a first embodiment, a rudimentary estimate of the received cyclic prefix is simply the observed samples, i.e.

$$\hat{i}_u[n] = z_u[n], \; n = -uK_{CP}, \ldots, -1.$$

This results in the blanking of the SOI estimate, i.e.

$$\hat{s}_u^{(1)}[n] = 0, \; n = -uK_{CP}, \ldots, -1,$$

which creates periodic erasures on the SOI that can be overcome by using forward error correcting (FEC) techniques.

In a second embodiment, an estimate of the RFO from the final channel estimate $\{\tilde{\underline{H}}_0[k]\}_{k=0}^{K-1}$ is computed, and used to reconstruct the cyclic prefix sequentially, starting from the first interfering OFDM symbol.

In another embodiment, which may be compatible with each of the embodiments described above, the SOI estimate $\hat{s}_u^{(1)}[n]$ may be demodulated and/or decoded using the SOI receiver. The receiver may then generate a second estimate of the SOI, $\hat{s}_u^{(2)}[n]$ by re-encoding and modulating the decoded data to the upsampled domain. This second estimate of the SOI may be subtracted from the observed samples, and the estimation of the interfering OFDM signal may be re-started using $$z_u^{(2)}[n] = z_u[n] - \hat{s}_u^{(2)}[n].$$

OFDM waveforms employ multiple subcarriers per frequency coherence interval, and as noted above, the channel vector $\underline{H}[k]$ exhibits correlation across contiguous frequency indices k. In certain embodiments, the hypothesized frequency-domain channel sequence $\tilde{H}[k]$ for a given hypothesized transmit sequence can be determined by taking into account the correlation across frequencies.

In a first embodiment, an adaptive filter with 2D+1 taps can be trained over the frequency-domain representation of the observed samples $\{Z[k]\}$ with the hypothesized modulation symbols $\tilde{Q}$ as a reference. For example, the taps may be adapted using the recursive least-squares (RLS) method. An initial estimate of the filter taps (at step $k=k_0$) can be computed as $$\tilde{H}[d, k_0] = \begin{cases} \dfrac{\tilde{Q}^*[(k_0 - d)_K]}{|\tilde{Q}[(k_0 - d)_K]|^2 + c} Z[k], & d \neq 0 \\ 0, & \end{cases}$$

wherein the vector $\underline{\tilde{H}}[k]$ is adapted based on $\{Z[k_0], Z[k_0+1], \ldots\}$, which denotes iterating through the observed samples in a circular fashion until the desired convergence is achieved.

In another embodiment, the correlation function of $\{\underline{\tilde{H}}[k]\}$ is employed. That is, since the channel delay spread is assumed to be no greater than $T_{CP}$, a small fraction ($KT_{CP}/T$) of subcarriers exhibit channel gain vectors that are highly correlated. In order to quantify this correlation, a wide-sense stationary uncorrelated scattering (WSSUS) model is assumed, wherein the $1/B_I$ spaced time-domain channel taps are pairwise uncorrelated zero-mean random variables, and for each $d \in [-D\; D]$, the correlation function $r[l] = \mathbb{E}\{\tilde{H}[d, k]\tilde{H}^*[d, k+l]\}$ is given by the K-point DFT of the power-delay profile (PDP). An initial estimate for the PDP may be set to a uniform distribution, $U[0, T_{CP}]$ and can be refined after estimating $\tilde{H}[d, k]$.

Figure 4:
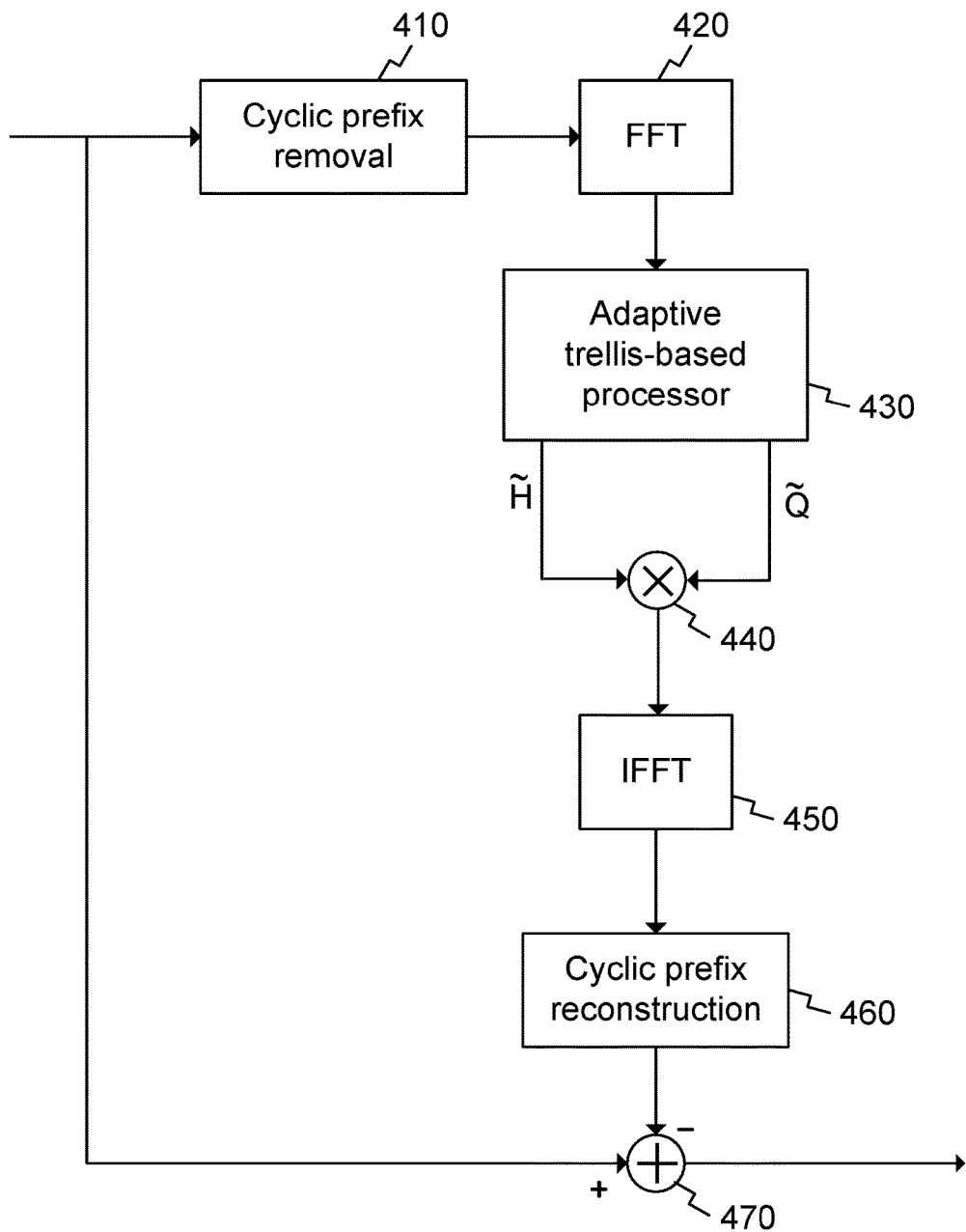
FIG. 4 is a block diagram for estimating and mitigating OFDM interference, according to an embodiment of the present invention.

FIG. 4 is a block diagram for estimating and mitigating OFDM interference, according to an embodiment of the present invention. The input to the embodiment shown in FIG. 4 is the received composite signal, which comprises the SOI and an interfering OFDM signal, wherein it is assumed that the OFDM signal has a much higher power than the SOI, and the receiver has no a priori information regarding the parameters of the interfering OFDM signal.

The cyclic prefix removal block 410 is configured to estimate the durations of the OFDM symbol and the cyclic prefix based on correlative techniques on a sequence of received interfering OFDM waveform samples consisting of multiple contiguous OFDM symbols. As noted above, the raw symbol duration T is the inverse of the subcarrier spacing of the OFDM waveform ($T = 1/\Delta f$). In an embodiment, the bandwidth of the OFDM interference ($B_I$) is then measured or determined, and the number of subcarriers is subsequently estimated as $K \approx B_I T$. Furthermore, the number of subcarriers in OFDM systems is typically a power of 2, which further assists in the refinement of this estimate. The estimate of the duration of the OFDM symbol and cyclic prefix enables the removal of the cyclic prefix from each of the received interfering OFDM symbols to generate a stream of raw OFDM symbols.

The raw time-domain OFDM symbols are transformed using the FFT 420, and the frequency-domain observed samples are used by the adaptive trellis-based processor 430 to generate the hypothesized modulation symbols ($\tilde{H}$) and the channel sequence ($\tilde{Q}$) that minimizes the error between their product, which is computed using a multiplier 440, and the frequency-domain observed samples.

The frequency-domain product of the hypothesized modulation symbols ($\tilde{H}$) and the channel sequence ($\tilde{Q}$) is transformed back into the time-domain using an inverse FFT (IFFT) block 450, thereby generating an estimate of the raw interfering OFDM symbol. The cyclic prefix reconstruction block 460 is used to prepend an estimate of the cyclic prefix to the estimate of the raw interfering OFDM symbol, thereby generating an estimate of the full interfering OFDM symbol, which is then subtracted from the observed samples by summer 470 to generate an interference-mitigated signal of interest.

As noted previously, the interference signal set may not be identical to the reference signal set. That is, the adaptive trellis-based processor 430 may select a reference signal set $\tilde{\mathbb{Q}}$ that is not necessarily equal to the interference signal set $\mathbb{Q}$. Despite a mismatch in the reference and interference signal sets, the adaptive trellis-based processor minimizes the error (in a least squares sense) between the product of the hypothesized modulation symbols ($\tilde{H}$) and the channel sequence ($\tilde{Q}$), and the frequency-domain representation of the observed samples.

Figure 5:
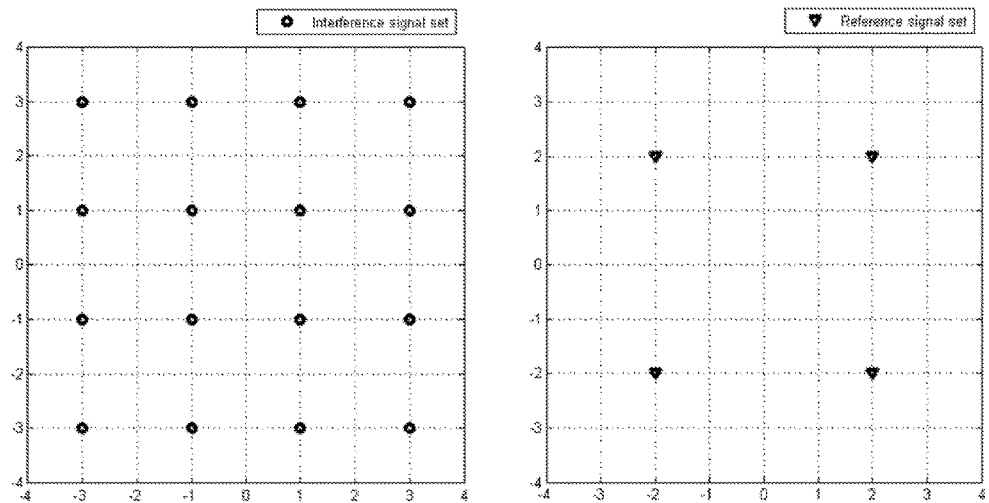
FIG. 5 is a transmit constellation diagram of the interference signal set and the reference signal set for a single-input single-output (SISO) system, according to an embodiment of the present invention.

FIG. 5 shows an example of the mismatch between the interference signal set and the reference signal set for a representative single-input single-output (SISO) system, according to an embodiment of the present invention. As shown in FIG. 5, the interference signal set is a 16-QAM (quadrature amplitude modulation) constellation, whereas the reference signal set is a (Quadrature Phase Shift Keying (QPSK) constellation. In this example, the method of estimating and mitigating OFDM interference interprets each of the QPSK constellation point as a centroid for each set of four points of the 16-QAM constellation in the corresponding quadrant.

For example, if the transmitted modulation symbol s from the interference signal set is selected from the upper-right quadrant, $q \in \{1+j, 1+3j, 3+j, 3+3j\}$, the receiver will select the modulation symbol $\tilde{q}=\{2+2j\}$ from the reference signal set as being representative of the transmitted modulation symbol, despite the specific transmitted symbol being unknown. Also, assume that the transmitted modulation symbol (of OFDM interference) is subject to a random channel gain, e.g. $h=-4+5j$. Thus, the received (or observed) symbol (ignoring additive white Gaussian noise) is $y=hq_1=(-4+5j)\times(1+3j)=-19-7j$.

In order to estimate and mitigate the OFDM interference, the receiver uses the methods and algorithms described herein (and, in an embodiment, implemented in the adaptive trellis-based processor 430 of FIG. 4) to compute the channel sequence element for this modulation symbol as $\tilde{h}=(-19-7j)/(2+2j)=(-6.5+3j)$. That is, the product of the hypothesized modulation symbol and the channel sequence, $(2+2j)\times(-6.5+3j)=(-19-7j)$, is equal to the observed sample. This enables the interfering OFDM signal to be estimated and mitigated, but does not necessarily enable the interference to be demodulated. In another embodiment, the reference signal set may happen to have been chosen to be identical to the interference signal set.

The embodiments described above, in the context of FIG. 3, may be implemented in SISO systems and use the generalized formulation of the basic principle described above in the context of FIG. 5. That is, an embodiment may employ adaptive trellis-based processing using the state and branch metric definitions described above to minimize the error between the frequency-domain representation of the observed samples and the product of the hypothesized modulation symbols and the channel sequence.

Embodiments may also be applied to multiple-input single-output (MISO) systems, wherein at least two transmitters transmit time-synchronized OFDM signals that may have some different parameters. That is, the single receiver receives a composite signal comprising the signal of interest, at least two interfering OFDM signals and white Gaussian noise, with the constraint that each of the interfering OFDM signals use the same number of subcarriers, but need not necessarily use other parameters identically. For example, each of the at least two transmitters may be different interference signal sets. Each of the interfering OFDM signals transmit interference signal sets through distinct channels, but a superposition of all the interference signal sets is received at the receiver.

Figure 6A:
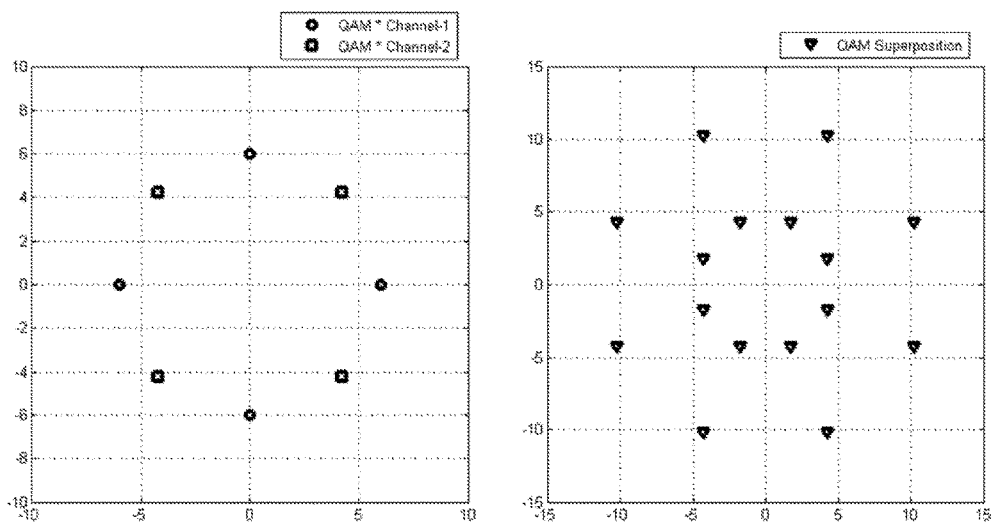
FIGS. 6A, 6B and 6C are receive constellation diagrams of the individual and superpositioned interference signal sets for a multiple-input single-output (MISO) system, according to an embodiment of the present invention.
Figure 6B:
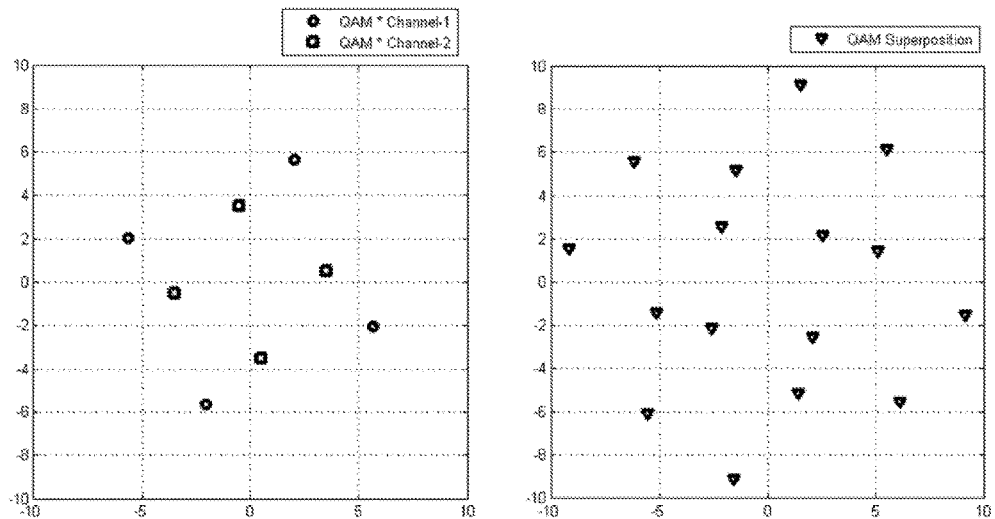
Figure 6C:
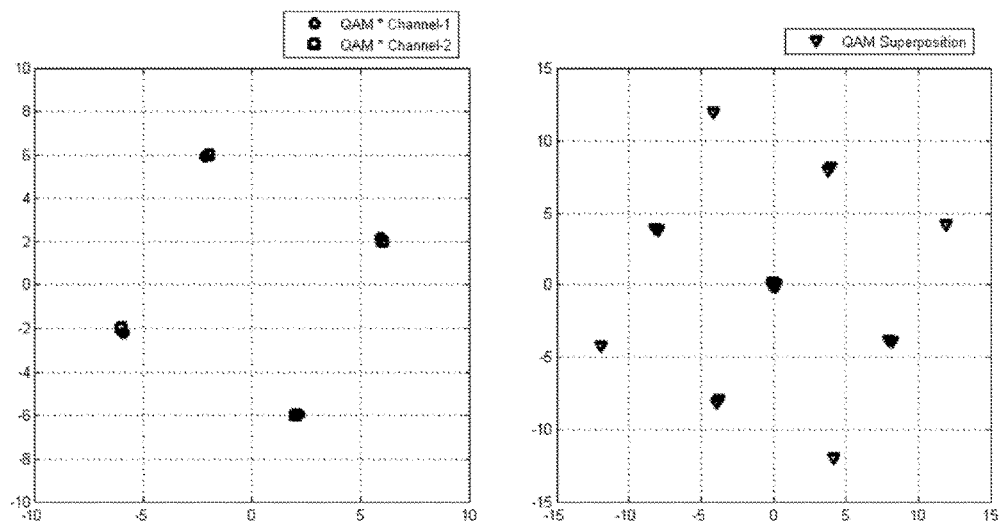

FIGS. 6A, 6B and 6C show the receive constellation diagrams of the individual and superpositioned interference signal sets for a MISO system. In particular, each of the left-side plots show QPSK constellations from two transmitters that have been subjected to distinct channel gain vectors, and the right-side plots show the superposition of the two QPSK constellations as seen by the receiver. The receiver typically expects a non-uniform constellation with sixteen points (from the first QPSK signal set being superposed on each point of the second QPSK signal set).

As seen in representative FIGS. 6A and 6B, the sixteen received constellation points may take on arbitrary and/or random shapes, and depend on the channel realizations that have affected the transmitted QPSK constellations. In another scenario, FIG. 6C shows that the sixteen constellation points may also superpose to effectively result in a nine-point constellation.

The methods and algorithms described above in the context of SISO systems may also be applied to estimate and mitigate the combined OFDM interfering signals from at least two interference transmitters. That is, an optimization minimizes the error between the frequency-domain representation of the observed samples and the product of the hypothesized modulation symbols and the frequency-domain channel sequence, wherein the observed samples will typically be one of the receive constellation points from the superpositioned interference signal sets subject to additive white Gaussian noise (AWGN).

Figure 7:
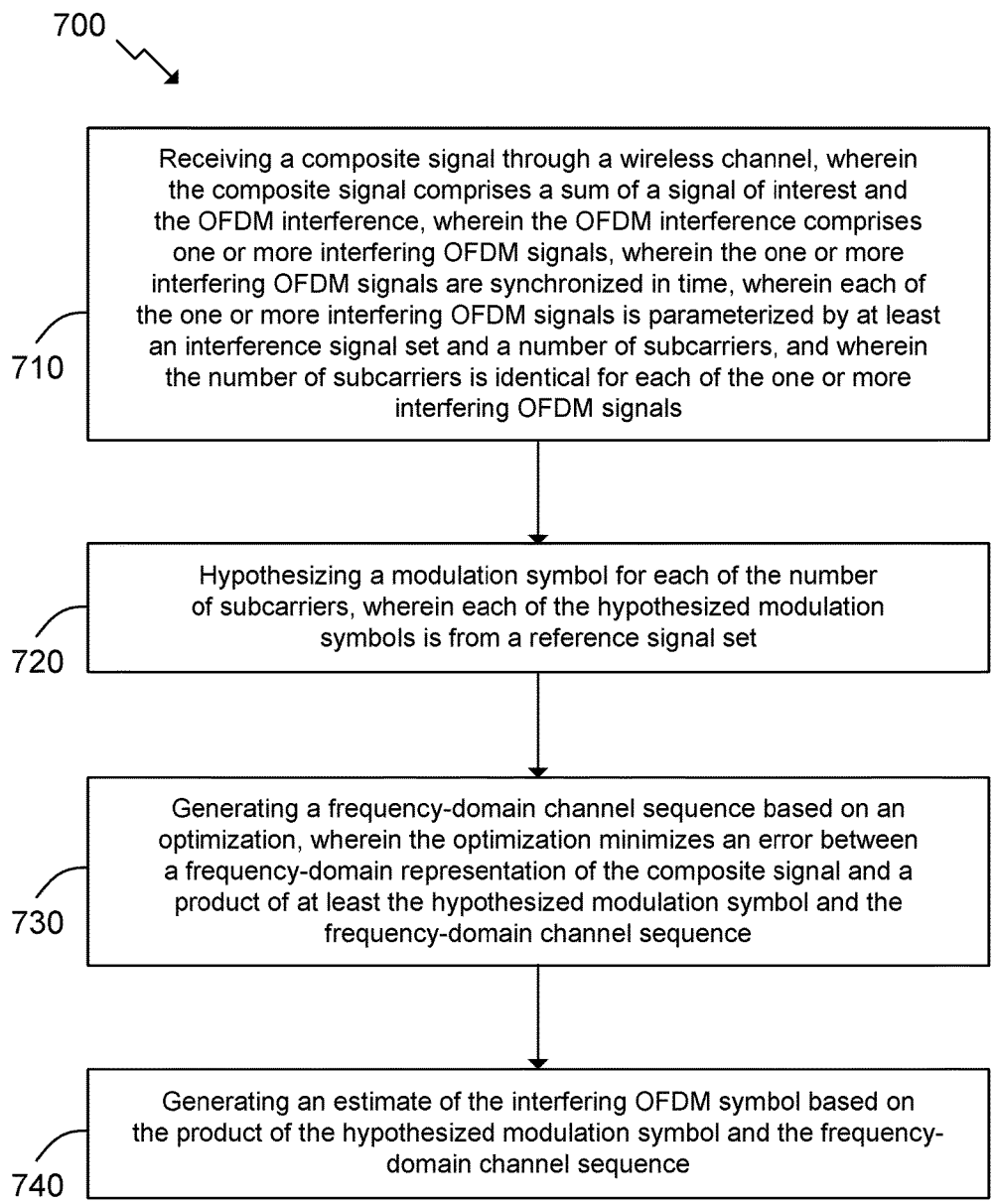
FIG. 7 is a flowchart for another method for estimating and mitigating OFDM interference, according to an embodiment of the present invention.

FIG. 7 is a flowchart for a method for estimating and mitigating OFDM interference in a MISO system, according to an embodiment of the present invention. In some embodiments, the order of steps in flowchart 700 may be changed. Furthermore, some of the steps in flowchart 700 may be skipped or additional steps added. This flowchart includes some steps that are similar to those shown in FIG. 3 and described above. At least some of these steps may not be separately described in this section.

At step 710, a composite signal comprising a sum of a signal of interest and OFDM interference is received, wherein the OFDM interference comprises one or more interfering OFDM signals. The embodiments described herein assume that each of the interfering OFDM signals are time-synchronized, and use the same number of subcarriers. However, other system parameters, including the individual interference signal sets may be different.

At step 720, a modulation symbol from a reference signal set is hypothesized for each of the number of subcarriers. As described above in the context of FIGS. 6A-6C, modulation symbols from the superposition of the interference signal sets, subject to distinct channel gains and AWGN, are received. In contrast to embodiments implemented in a SISO system, wherein the reference signal set may happen to be identical to the interference signal set, the reference signal set in a MISO system is necessarily only representative of the superposition of the interference signal sets.

Similar to the method described in FIG. 3 in the context of a SISO system, step 730 generates a frequency-domain channel sequence based on an optimization that minimizes the error between the frequency-domain representation of the observed samples (from the composite signal) and the product of the hypothesized modulation symbols and the frequency-domain channel sequence, and at step 740, an estimate of the interfering OFDM symbol is generated based on the hypothesized modulation symbol and the frequency-domain channel sequence.

Figure 8:
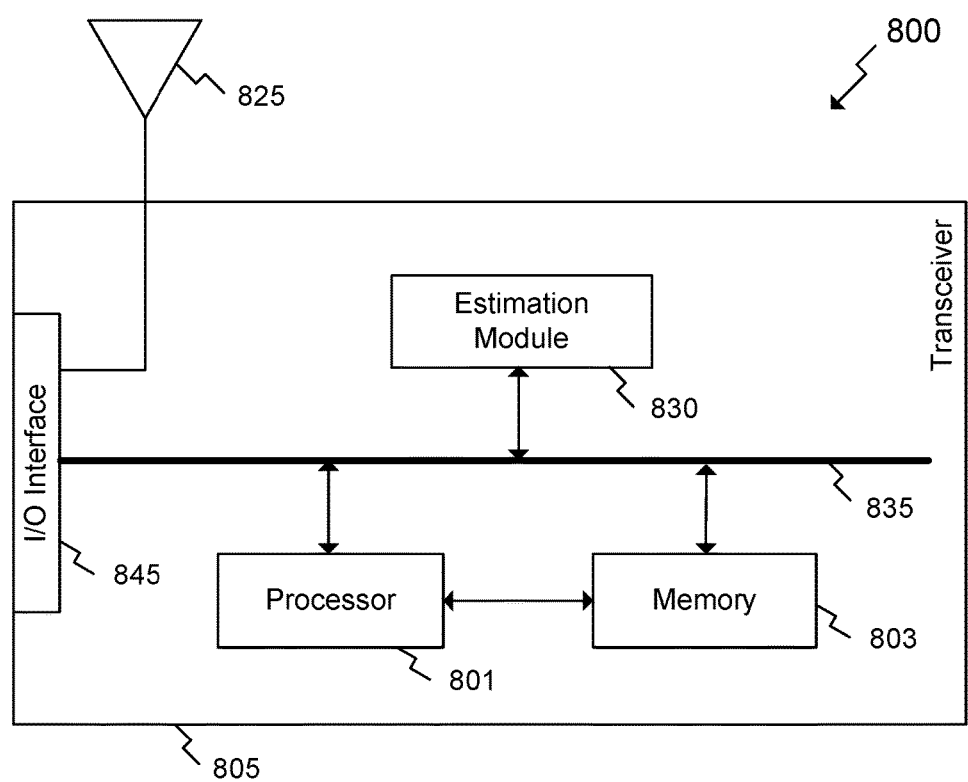
FIG. 8 is a block diagram of a system for estimating and mitigating OFDM interference, according to an embodiment of the present invention.

A transceiver for estimating and mitigating OFDM interference that implements an embodiment of the present invention is shown in FIG. 8. This transceiver is provided merely as an example that may be used with the methods described herein. A processor 801 is connected to a memory 803 that interfaces with an estimation module 830 via an interface 835. The estimation module 830 is configured to estimate the interfering OFDM symbol, which may be received through an antenna 825 and an input/output (I/O) interface 845.

In an embodiment, the estimation module 830 may be embedded in the processor 801. In another embodiment, the estimation module 830 may be implemented in a field programmable gate array (FPGA) or in software, the latter being implemented in either an ARM or other processor.

The processor 801 shown in FIG. 8 may comprise component digital processors, and may be configured to execute computer-executable program instructions stored in memory 803. For example, the component digital processors may execute one or more computer programs for estimating and mitigating OFDM interference in accordance with embodiments of the present invention.

Processor 801 may comprise a variety of implementations for estimating and mitigating OFDM interference, including a microprocessor, a digital signal processor (DSP), an application-specific integrated circuit (ASIC), one or more field programmable gate arrays (FPGAs), state machines, or the like. Processor 801 may further comprise a programmable electronic device such as a programmable logic controller (PLC), a programmable interrupt controller (PIC), a programmable logic device (PLD), a programmable read-only memory (PROM), an electronically programmable read-only memory (EPROM or EEPROM), or another similar device.

Memory 803 may comprise a non-transitory computer-readable medium that stores instructions which, when executed by the processor 801, cause the processor 801 to perform various steps, such as those described herein. Examples of computer-readable media include, but are not limited to, electronic, optical, magnetic, or other storage or transmission devices capable of providing the processor 801 with computer-readable instructions. Other examples of computer-readable media comprise, but are not limited to, a floppy disk, CD-ROM, magnetic disk, memory chip, ROM, RAM, ASIC, configured processor, any optical medium, any magnetic tape or other magnetic medium, or any other medium from which a computer processor can access data. In addition, various other devices may include a computer-readable medium such as a router, private or public network, or other transmission device. The processor 801 and the processing described may be in one or more structures, and may be dispersed throughout one or more structures.

Embodiments in accordance with aspects of the present subject matter can be implemented in digital electronic circuitry, computer hardware, firmware, software, or in combinations of the preceding. In one embodiment, a computer may comprise a processor or processors. A processor comprises or has access to a computer-readable medium, such as a random access memory (RAM) coupled to the processor.

While the present subject matter has been described in detail with respect to specific embodiments thereof, it will be appreciated that those skilled in the art, upon attaining an understanding of the foregoing, may readily produce modifications to, variations of, and equivalents to such embodiments. Accordingly, it should be understood that the present disclosure has been presented for purposes of example rather than limitation, and does not preclude inclusion of such modifications to, variations of and/or additions to the present subject matter as would be readily apparent to one of ordinary skill in the art.

What is claimed:

1. A method for estimating and mitigating orthogonal frequency division multiplexing (OFDM) interference, comprising:
   receiving a composite signal through a channel, wherein the composite signal comprises a sum of a signal of interest and the OFDM interference, wherein the OFDM interference comprises one or more interfering OFDM signals, wherein the one or more interfering OFDM signals are synchronized in time, wherein each of the one or more interfering OFDM signals is parameterized by at least an interference signal set and a number of subcarriers, and wherein the number of subcarriers is identical for each of the one or more interfering OFDM signals;
   hypothesizing a modulation symbol for each of the number of subcarriers, wherein each of the hypothesized modulation symbols is from a reference signal set;
   generating a frequency-domain channel sequence based on an optimization, wherein the optimization comprises a correlation function based on a frequency-domain representation of the channel, and wherein the optimization minimizes an error between a frequency-domain representation of the composite signal and a product of at least the hypothesized modulation symbol and the frequency-domain channel sequence in a least-squares sense; and
   generating an estimate of the interfering OFDM symbol based on the product of the hypothesized modulation symbol and the frequency-domain channel sequence.

2. The method of claim 1, wherein hypothesizing the modulation symbol for each of the subcarriers is based on a trellis with a number of states.

3. The method of claim 2, wherein the number of states is based on one or both of a coherence bandwidth of the channel and a frequency offset between the one or more interfering OFDM signals.

4. The method of claim 1, wherein a cardinality of the superposition of the interference signal sets is greater than a cardinality of the reference signal set.

5. A method for estimating an interfering orthogonal frequency division multiplexing (OFDM) symbol, the interfering OFDM symbol comprising a plurality of subcarriers, each of the subcarriers comprising a modulation symbol from an interference signal set, the method comprising:
   receiving a composite signal through a channel, wherein the composite signal comprises a sum of a signal of interest and an interfering OFDM signal, and wherein the interfering OFDM signal comprises the interfering OFDM symbol;
   hypothesizing a modulation symbol for each of the subcarriers of the interfering OFDM symbol, wherein each of the hypothesized modulation symbols is from a reference signal set;
   generating a frequency-domain channel sequence based on an optimization, wherein the optimization comprises a correlation function based on a frequency-domain representation of the channel, and wherein the optimization minimizes an error between a frequency-domain representation of the composite signal and a product of at least the hypothesized modulation symbol and the frequency-domain channel sequence in a least-squares sense; and
   generating an estimate of the interfering OFDM symbol based on the product of the hypothesized modulation symbol and the frequency-domain channel sequence.

6. The method of claim 5, further comprising:
estimating at least one parameter of the interfering OFDM symbol.

7. The method of claim 6, wherein the at least one parameter comprises one or more of a number of the plurality of subcarriers, a duration of the interfering OFDM symbol, and a length of a cyclic prefix of the interfering OFDM symbol.

8. The method of claim 7, wherein the interfering OFDM symbol comprises a concatenation of the cyclic prefix and a raw interfering OFDM symbol, the method further comprising:
upsampling the product of the hypothesized modulation symbol and the frequency-domain channel sequence;
generating an upsampled frequency-domain interference estimate based on the upsampled product of the hypothesized modulation symbol and the frequency-domain channel sequence;
computing a time-domain representation of the upsampled frequency-domain interference estimate;
generating an estimate of the raw interfering OFDM symbol based on the time-domain representation of the upsampled frequency-domain interference estimate; and
prepending an estimate of the cyclic prefix to the estimate of the raw interfering OFDM symbol to generate the estimate of the interfering OFDM symbol.

9. The method of claim 5, wherein hypothesizing the modulation symbol for each of the subcarriers is based on a trellis with a number of states.

10. The method of claim 9, wherein the number of states is based on one or both of a coherence bandwidth of the channel and a residual frequency offset (RFO).

11. The method of claim 5, wherein the optimization comprises using a recursive least-squares algorithm to adapt taps of an adaptive filter, wherein the taps of the adaptive filter are trained based on the composite signal and the hypothesized plurality of symbols.

12. The method of claim 5, wherein the frequency-domain representation of the channel is based on a power-delay-profile (PDP) of the channel.

13. The method of claim 5, wherein a bandwidth of the interfering OFDM signal is smaller than a bandwidth of the signal of interest.

14. The method of claim 5, wherein a cardinality of the interference signal set is greater than a cardinality of the reference signal set, and wherein at least one symbol of the reference signal set serves as a centroid for a plurality of symbols of the interference signal set.

15. The method of claim 14, wherein the interference signal set is a 16-QAM (quadrature amplitude modulation) constellation, wherein the reference signal set is a (Quadrature Phase Shift Keying (QPSK) constellation, and wherein each symbol of the QPSK constellation serves as the centroid for four symbol points of the 16-QAM constellation in a respective quadrant.

16. The method of claim 5, wherein a cardinality of the interference signal set is equal to a cardinality of the reference signal set.

17. A system for estimating an interfering orthogonal frequency division multiplexing (OFDM) symbol, the interfering OFDM symbol comprising a plurality of subcarriers, each of the subcarriers comprising a modulation symbol from an interference signal set, the system comprising:
a receiver configured to receive a composite signal through a channel, wherein the composite signal comprises a sum of a signal of interest and an interfering OFDM signal, wherein the interfering OFDM signal comprises the interfering OFDM symbol; and
an estimation module configured to:
hypothesize a modulation symbol for each of the subcarriers of the interfering OFDM symbol, wherein each of the hypothesized modulation symbols is from a reference signal set;
generate a frequency-domain channel sequence based on an optimization, wherein the optimization comprises a correlation function based on a frequency-domain representation of the channel, and wherein the optimization minimizes an error between a frequency-domain representation of the composite signal and a product of at least the hypothesized modulation symbol and the frequency-domain channel sequence in a least-squares sense; and
generate an estimate of the interfering OFDM symbol based on the product of the hypothesized modulation symbol and the frequency-domain channel sequence.

18. The system of claim 17, wherein the estimation module is further configured to:
estimate at least one parameter of the interfering OFDM symbol.

19. The system of claim 18, wherein the at least one parameter comprises one or more of a number of the plurality of subcarriers, a duration of the interfering OFDM symbol, and a length of a cyclic prefix of the interfering OFDM symbol.

20. The system of claim 17, wherein the interfering OFDM symbol comprises a concatenation of the cyclic prefix and a raw interfering OFDM symbol, and wherein the estimation module is further configured to:
upsample the product of the hypothesized modulation symbol and the frequency-domain channel sequence;
generate an upsampled frequency-domain interference estimate based on the upsampled product of the hypothesized modulation symbol and the frequency-domain channel sequence;
compute a time-domain representation of the upsampled frequency-domain interference estimate;
generate an estimate of the raw interfering OFDM symbol based on the time-domain representation of the upsampled frequency-domain interference estimate; and
prepend an estimate of the cyclic prefix to the estimate of the raw interfering OFDM symbol to generate the estimate of the interfering OFDM symbol.

* * * * *